United States Patent [19]

Landt et al.

[11] Patent Number: 5,030,807
[45] Date of Patent: Jul. 9, 1991

[54] SYSTEM FOR READING AND WRITING DATA FROM AND INTO REMOTE TAGS

[75] Inventors: Jeremy A. Landt, Los Alamos; Alfred R. Koelle, Santa Fe, both of N. Mex.

[73] Assignee: Amtech Corporation, Santa Fe, N. Mex.

[21] Appl. No.: 465,428

[22] Filed: Jan. 16, 1990

[51] Int. Cl.$^5$ ............................................. G06R 15/20
[52] U.S. Cl. ................................... 235/375; 235/380; 342/44; 342/50
[58] Field of Search ....................... 235/375, 380, 439; 342/44, 50

[56] References Cited

U.S. PATENT DOCUMENTS

4,739,328  4/1988  Foelle et al. .......................... 342/44
4,740,792  4/1988  Sagey et al. .......................... 342/50
4,888,591  12/1989 Landt et al. .......................... 342/44

Primary Examiner—Harold Pitts
Attorney, Agent, or Firm—Roger Borovoy

[57] ABSTRACT

The subject invention relates to a system for identifying, for writing data into and reading data out of electronic tags which may be attached to moving and moveable objects. An interrogator sends an RF signal to a remote tag, the signal including data intended to be received and stored in the tag. The tag backscatter-modulates the received signal with data temporarily and permanently stored in the tag, including data indicating the identity of the object to which the tag is attached. The interrogator has the capability of (1) recognizing the identity of the tagged object from the returned backscatter-modulated signal and (2) transmitting data to the tag only if it has data to be transmitted to that particular tagged object. This permits data to be selectively transmitted to a tag and received and stored by that tag only after the tag has been identified as a correct one to receive that data. The tag, in addition, may have the capability of increasing its sensitivity to the receipt of transmitted data after receiving a signal from the interrogator of sufficient strength to be capable of transmitting data to that tag.

11 Claims, 4 Drawing Sheets

INTERROGATOR-TAG SIGNALING SEQUENCE

INTERROGATOR RECEIVES ID SIGNAL FROM TAG — 10

INTERROGATOR RECOGNIZES TAG ID SIGNAL AS VALID
AND
INTERROGATOR RECOGNIZES THAT THE TAG IS A READ/WRITE TAG } — 11

TAG SENSES THAT TRANSMITTED RF FIELD IS SUFFICIENT FOR A WRITE
AND
INCREASES ITS OWN RECEPTION SENSITIVITY
AND
CHANGES ITS OWN MODULATED ID CODE TO INDICATE READINESS FOR WRITE } — 12

INTERROGATOR RECOGNIZES TAG'S READINESS FOR A WRITE } — 13

INTERROGATOR CHECKS TO SEE IF IT HAS A "MESSAGE" FOR THAT TAG } — 14

INTERROGATOR SENDS THE MESSAGE TO TAG } — 15

TAG ECHOES ITS NEW DATA CONTENTS BACK TO INTERROGATOR } — 16

INTERROGATOR CHECKS NEW DATA AGAINST THE MESSAGE IT SENT } — 17

IF CORRECT, TRANSACTION IS TERMINATED } — 18

IF INCORRECT, INTERROGATOR TRIES AGAIN } — 19

STATE DIAGRAM

FIGURE 4

SYSTEM FOR READING AND WRITING DATA FROM AND INTO REMOTE TAGS

BACKGROUND OF THE INVENTION AND PRIOR ART

The subject invention relates to a system for reading data from remote tags and for writing data into those tags. There are a number of prior art object and vehicle identification systems which use electronic tags containing fixed data about the particular object. These electronic tags were originally developed by the United States National Laboratory at Los Alamos, N. Mex., for the Department of Agriculture to identify livestock animals. A tag containing the animal's identification data in coded, electronically readable form, is attached to or implanted in the animal. Electronic readers are placed at feeding stations to read the tags as the animals passed nearby. These readers, also called interrogators, transmit an RF signal which, in turn, is "backscatter-modulated" with the identification data from the tag. These tags have an antenna which transmits the backscatter-modulated signal, containing the information from the tag, to the interrogator. These early systems are described in U.S. Pat. Nos. 4,075,632 and 4,360,810.

As the technology progressed, it was found that these systems for identifying remote moving objects had utility far beyond animal identification. For example, the tags may be placed in any moving or moveable objects, such as automobiles, shipping containers or railroad cars. The information in these tags can be used to keep track of the location, identity and contents of these objects. One important use of these systems is for automated toll collection on a tollway. Automobiles passing through a toll lane need not stop to deposit cash. The electronic interrogator alongside of the toll lane electronically identifies the moving car as it passes by, and triggers a computerized debiting system so that the car owner's credit card may automatically be debited for the amount of the toll. Similarly, shipping containers or railroad rolling stock can be continually monitored at ports, loading docks or along the tracks so that their location, identity and contents can be continually monitored on a central computer. U.S. Pat. Nos. 4,739,328; 4,782,345; 4,786,907; 4,816,839; 4,835,377 and 4,853,705 all describe aspects of these systems, including antennas and programmers used in these systems to identify remote objects.

In certain applications, it has become important not only to read the data contained in these electronic tags attached to the moving objects, but also to modify that data, or to "write" data into the tags while they are in motion. For example, it may be important not only to know the contents of a railroad car but also the route and time it took to reach a particular destination. Such route data, or data from which information may be calculated by a computer, may be written into the tag as it passes interrogators along its route. U.S. Pat. No. 4,390,880 describes one technique for both writing data into and reading data out of such a tag. In this patent, the interrogator at the remote receiving station first transmits to the tag, prior to being able to identify the tagged object and prior to transmitting any information-bearing signals to the tag, an "interrogation command signal". This signal tells the tag to transmit the identification data stored in the tag's memory to the transmitter. After the interrogator recognizes this identification data, it sends a "key signal" to the tag to enable a WRITE operation. The tag first must receive and recognize this key signal transmitted from the interrogator before the WRITE may take place.

This sequence requires that, prior to the remote receiving station (the interrogator) receiving any identification information back from the tag, that the tag first be "enabled" by the receipt and recognition of the transmitted interrogation signal. The tag and the interrogator must therefore be in sufficiently close proximity so that the tag first can receive and understand this interrogation signal from the transmitter, recognize it, and finally retransmit the data stored in its memory back to the interrogator. This need for the tag to be in close enough proximity to the interrogator to receive the enabling interrogation signal reduces the time window available for reading the contents of the tag and for writing data into the tag. In some applications, such as reading and writing data from and into a fast-moving train, this "handshake" delay can be sufficient to miss the tag completely.

The system of this invention considerably lessens this handshake delay by employing a tag which continually indicates its own identity, even in the absence of any interrogating command signal from the interrogator. No interrogation command signal is transmitted by the interrogator to enable reading of the tag. The tags of the subject invention use a continuously scrolling fixed code to transmit their identity. This same transmitted code also tells the interrogator whether or not the tag is in sufficiently close proximity so that the interrogator can confidently transmit and write data to the tag. Since the maximum range at which the interrogator can read the backscatter-modulated, transmitted signal from the tag is considerably greater than the maximum write range allowable for the interrogator to write data into the tag, the ability of the interrogator to read all the necessary information from the tag in advance of the tag coming into write range saves critical time. Accordingly, the technique used in this invention substantially speeds up reading and writing, greatly increasing the maximum operational range.

For example, a tag of this invention can be read as far as 80 feet away from an interrogator, but can only be written to at a maximum distance of about 20 feet. To the contrary, the tags described in U.S. Pat. No. 4,390,880 can only be read at about 6 feet and written into at about 4 feet. In the system of the subject invention, a tag may first be read and identified as it approaches a distance of about 80 feet from the interrogator. It may be written to at about 20 feet, saving the critical time that the tag is within the 20 feet write range of the interrogator exclusively for the more range-limited write operation.

BRIEF DESCRIPTION OF THE INVENTION

Briefly, the system of this invention for identifying and for writing data into remote objects, which may be in motion relative to the interrogator, employs an interrogator for sending an RF signal to the remote object. This signal includes data intended to be received and stored by the remote object. The remote objects are capable, upon receipt of the transmitted RF signal, of backscatter-modulating that RF signal and returning a signal which is backscatter-modulated with data indicating the identity of the remote object. The interrogator has the capability of (1) recognizing the identity of the remote object from the returned, backscatter-modulated signal and (2) transmitting data to the remote object only if the interrogator has data to be transmitted to that particular, identified remote object. In this manner, data may be selectively transmitted to and received and stored by a remote object only after the remote object has been identified as the correct remote object for the receipt of such data.

The remote object is continuously powered for backscatter-modulating received RF signals even when no actual RF signal is being received. This is different from the tags of the prior art which transmit the identification information only when triggered by an interrogation signal from the transmitter. In a preferred embodiment of the invention, the write sensitivity of the tag is automatically increased when the tag senses that an RF field from an interrogator is sufficiently strong to write data into the tag.

BRIEF DESCRIPTION OF THE DRAWINGS

The invention will be better understood by reference to the following drawings in which.

DETAILED DESCRIPTION OF THE INVENTION

Unlike the tags of the prior art, the tag of the invention continuously scrolls through the data in its memory. In a preferred embodiment, this data is contained in two 128-bit code frames. The first code frame holds permanent data; the second holds temporary, or overwriteable data. This type of tag is called a "read/write" tag. Both permanent and temporary data are continuously scrolled by the tag and thus always available to be read by an interrogator of the invention. The details of these tags and interrogators are not described herein except the aspects providing the novel features of this invention because they have been previously described in one or more of U.S. Pat. Nos. 4,739,328; 4,782,345; 4,786,907; 4,816,839; 4,835,377 and 4,853,705. The data encoding used to read these tags is the same as described in U.S. Pat. No. 4,739,328.

As soon as the tag comes within range of the transmitted RF signal from an interrogator, the tag will backscatter-modulate the signal from the interrogator, in sequence, with the two 128-bit code frames. These will then be received and interpreted by the interrogator, as shown in step 10 of FIG. 1. Assuming the tag is a proper one, the interrogator will recognize the tag's ID signal as valid. It will also capture all the data from the tag, which may include its identity as well as other information about the container or the vehicle to which it is attached, such as its weight, contents, size and the like. Moreover, from certain encoding of one or both of the 128-bit code frames, the interrogator will recognize that the tag is a read/write tag (as opposed to a read-only tag). Any single bit or pair of bits of either of the two 128-bit code frames, for example, may be used to identify that the tag is read/write. This identification step is shown as step 11 in FIG. 1.

Figure 1:
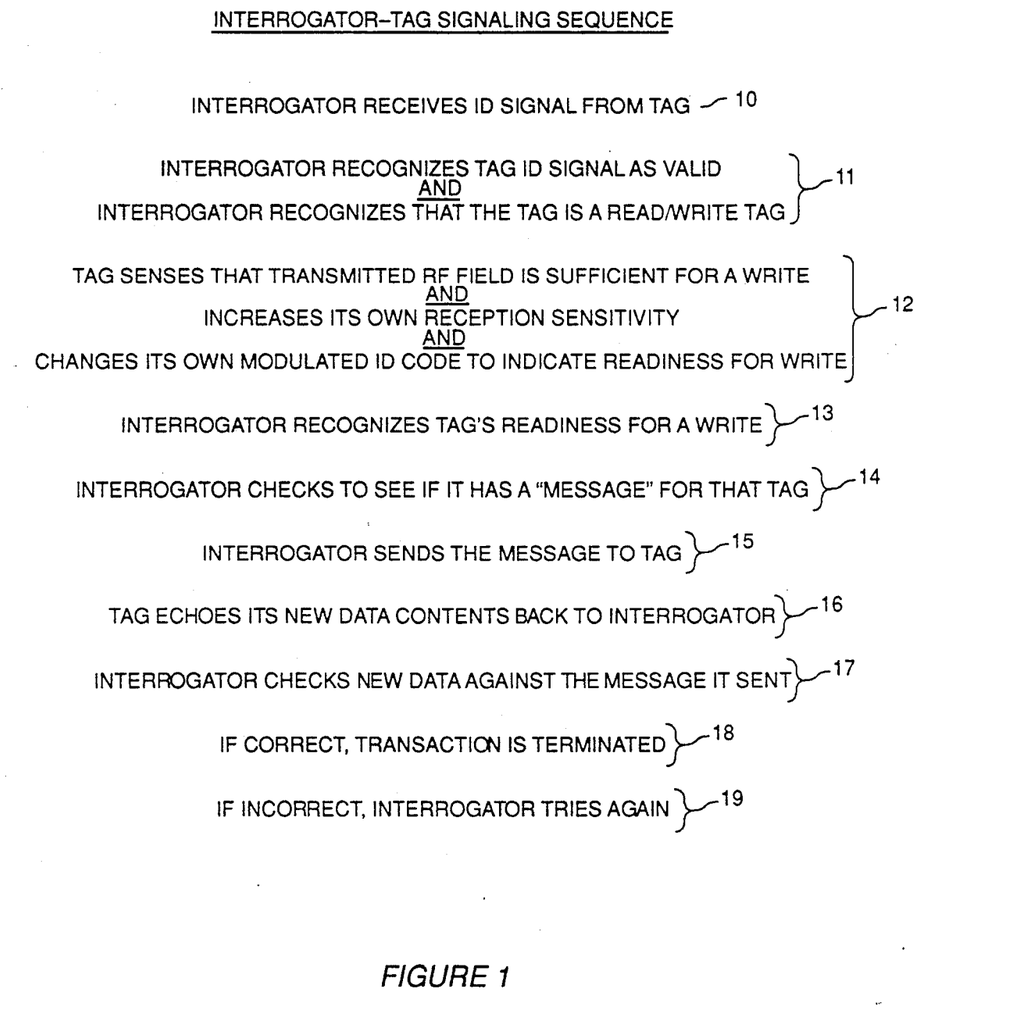
FIG. 1 illustrates the interrogator-tag signalling sequence of the invention.

As the tag approaches closer to the interrogator (or the interrogator approaches closer to the tag in some applications where the interrogator is moving and the tag is fixed), the tag continually monitors the strength of the RF field from the interrogator. As soon as the tag senses that the transmitted RF field is sufficiently strong to enable data to be securely written into the tag, the tag will change the code in one or more code frames which it is backscatter-modulating onto the transmitted RF signal, to so indicate.

For example, if two bits of one of the tag's code frames are used to identify that the tag is a read/write tag, the order of these two bits may be reversed when the tag senses that the RF signal is sufficiently strong. The so modified backscatter-modulated signal then is returned to the interrogator, indicating that there is sufficient transmission strength for a write operation. This is shown in step 12 of FIG. 1. At the same time, the tag increases its own reception sensitivity, also as indicated in step 12, in a manner which will be described later. All three of these steps go on at once, as shown in step 12 of FIG. 1.

The re-coded backscatter-modulated recognition signal from the tag alerts the interrogator that there is a candidate read/write tag in its RF range, that the sensitivity of the tag has been increased and that it may write data into this tag if it so desires. In step 13 of FIG. 1, the interrogator recognizes that: (1) there is a read/write tag in its range; and (2) the sensitivity of that tag has been increased so that it is ready to receive a WRITE of any data from the interrogator which is to be written into the tag's memory. As indicated in step 14, the interrogator then checks to see if it has a message for that tag, having already received and read the tag's identification. The interrogator compares the received tag identification with its message list to see whether it has a message for that tag. If it does, it then sends the message to the tag on the RF carrier, as shown in step 15 of FIG. 1.

After receipt and storage of the message from the interrogator, the tag echoes its newly received data on a backscatter-modulated signal sent back to the interrogator, as illustrated in step 16. The interrogator, in turn, checks the new data which it gets back from the tag against the message it sent out on the transmitted RF signal, as shown in step 17 in FIG. 1. If there is agreement, the WRITE operation is successfully completed, and thus terminated, as shown in step 18. If there is an error, the interrogator will retransmit the message, as shown in step 19, as long as the tag is still in range to receive the message. This process is repeated until a successful transmission occurs, or the tag indicates by its scrolling message (or absence of any message) that it is out of range for any more WRITE operations.

The signalling sequence shown in FIG. 1 has significant advantages. Typically, a tag enters the range at which it may be read by the interrogator a significant period of time before it gets close enough for the interrogator reliably to write data into the tag. This difference arises because of the difference between the natures of read and write procedures. The system of this invention takes advantage of this range requirement differential by completing the initial tag read and recognition process prior to the tag entering into the write zone where it may be written into. This allows significantly more write transaction time because none of the time while the tag is in the write zone need be taken up by the recognition sequence, which already has been completed. The fact that the tag of the invention is continuously scrolling its identification data makes possible virtually instant recognition by the interrogator.

Furthermore, the sequence of operation shown in FIG. 1 ensures that the interrogator does not waste time trying to write data into a tag that is not within its range. The interrogator will not attempt to write into a tag until it receives the backscatter-modulated range and sensitivity verification shown in step 13 of FIG. 1. However, as soon as that verification is received by the interrogator, indicating the tag remains within range, the entire time that the tag is within the write range can be used for the writing sequence.

The signalling sequence of the invention has considerable advantages over the prior art sequence which requires the interrogator first to "wake up" the tag before the interrogator can identify it. With the prior art systems the tag had to be in the "write zone" before it can be identified. The "wake up" command is similar to a write command and thus requires that the tag be in the much shorter "write range" in order to be woken up. Since the tag of the subject invention is always scrolling, it can be identified by the interrogator while it is in the longer read range, thereby substantially speeding up tag-interrogator communications.

In a preferred embodiment, the tags and readers of the read/write system of this invention are compatible with the tags and readers of the read-only system described in the above-identified earlier patents. For example, if a read-only tag enters the RF field of a read/write interrogator, the data on the read-only tag will be read and the tag identified as a read-only tag. The reader and host computer can then use this data as desired. Conversely, if a read/write tag of this invention enters the RF field of a read-only interrogator of the earlier patents, the data in the tag will be read, and the reader and host computer can use this data as desired.

Figure 2:
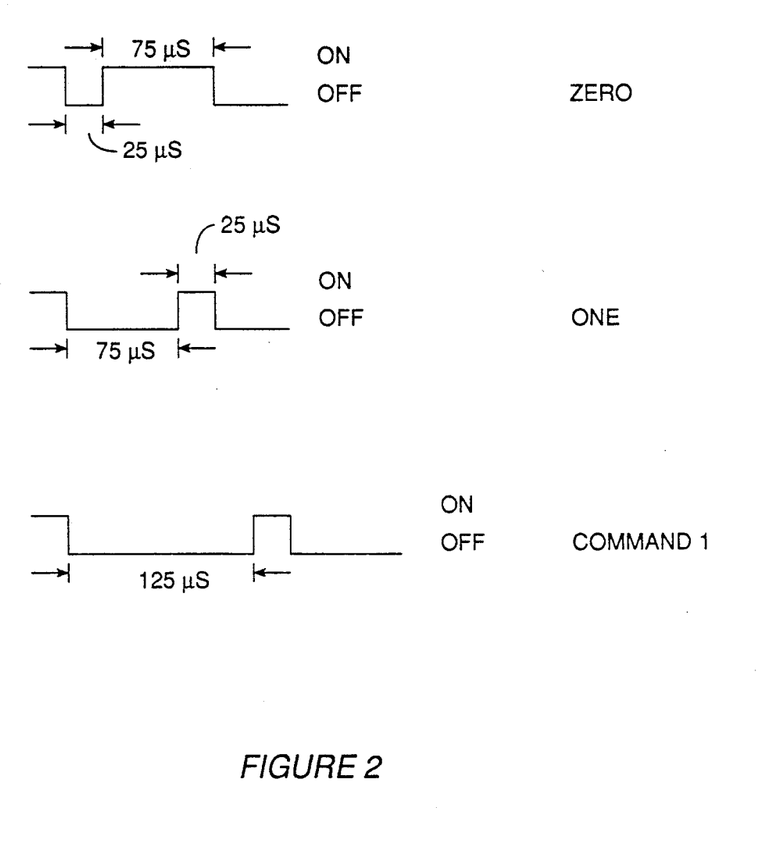
FIG. 2 shows the RF WRITE code used for the pulses of the invention.

In order to accomplish the signalling sequence shown in FIG. 1, the interrogator and tag need use only three different signals for writing data into the tag. The first signal, shown in FIG. 2, represents a binary "ZERO" by turning the RF off for a period of 25 microseconds. The second signal, which turns the RF off for a period of 75 microseconds, represents a binary one. The third signal, which turns the RF off for 125 microseconds, indicates a "COMMAND 1" signal, the use of which will be described below. Using the signalling technique shown in FIG. 1 and the state diagram shown in FIG. 4, the entire WRITE operation between the interrogator and the tag may be carried out using only these three signals shown in FIG. 2.

Figure 3:
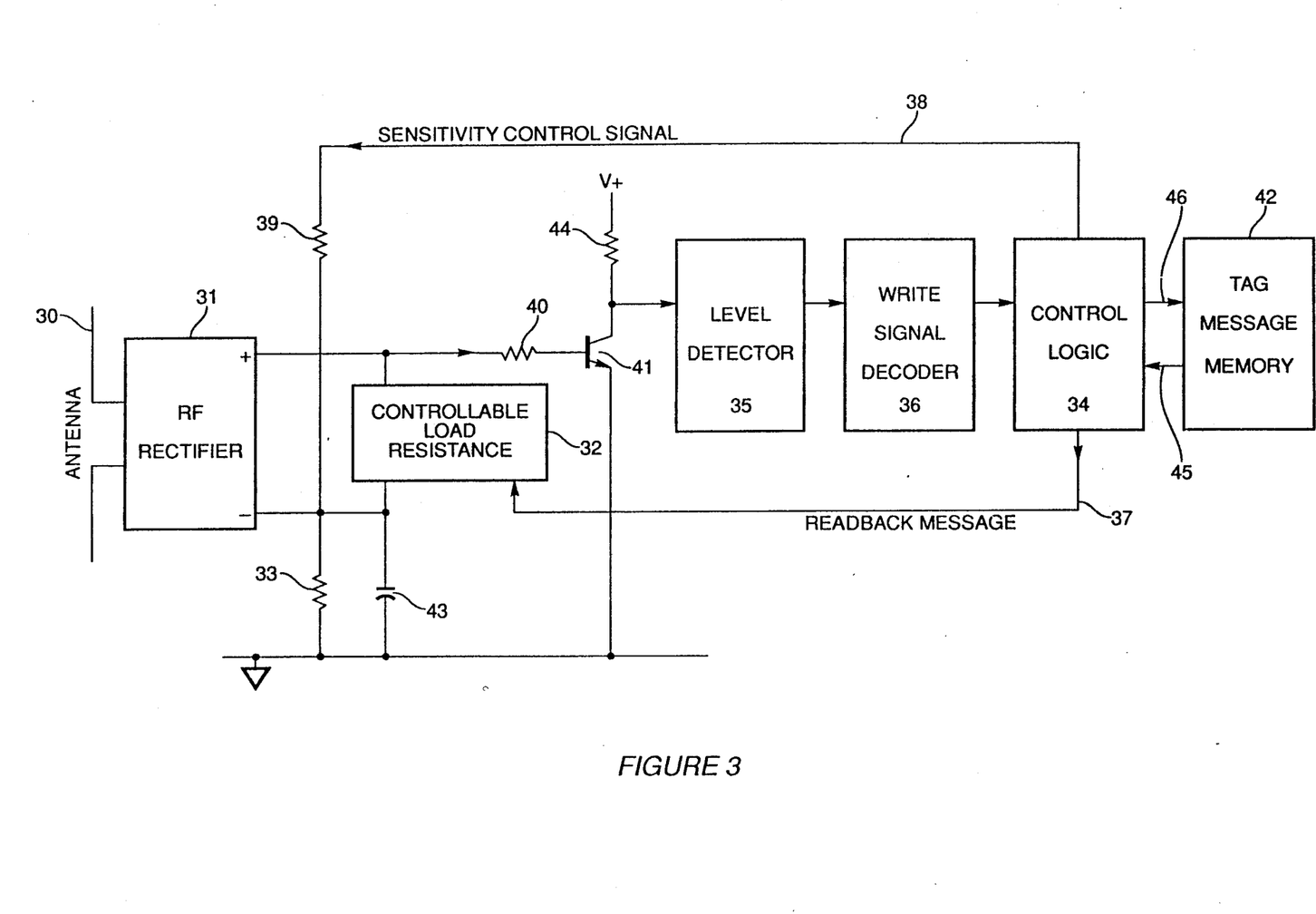
FIG. 3 is a block diagram, partially in schematic, of the circuitry of the read/write tag of the invention.

The circuitry of a preferred embodiment of the tag of this invention is shown in FIG. 3. The tag has an antenna 30, which was described in U.S. Pat. Nos. 4,782,345 and 4,816,839. Antenna 30 is connected to an RF rectifier 31 connected to controllable load resistance 32, as shown. Load resistance 32 modulates the load on the RF rectifier which, in turn, modulates the backscatter to send the coded signals back from the tag to the interrogator. This system is described in more detail in U.S. Pat. No. 4,075,632.

Unlike the systems described in the above patent, as soon as level detector 35 detects that the RF signal reaching antenna 30 is above a predetermined threshold level, it sends a signal through write signal decoder 36 to control logic 34. Control logic 34 at the same time changes the data in the tag message memory, for example, by reversing two bits of information. This changed data comes out on line 37 as the "read back message" of the signal which passes to controllable load resistance 32. Controllable load resistance 32 modulates the backscatter by changing the load on RF rectifier 31, which in turn changes the RF load on antenna 30. The tag thus sends a backscatter-modulated signal having a two-bit code change back to the interrogator, indicating to the interrogator (1) that the tag is within the write range, and (2) that the tag's threshold sensitivity has been increased, as will be explained below.

When the tag comes within close enough proximity to the interrogator so the RF field is of sufficient strength for information to be written into the tag, the tag's sensitivity is increased. When level detector 35 senses the presence of sufficient RF strength for a WRITE operation, a SENSITIVITY CONTROL SIGNAL is emitted from control logic 34 onto line 38 and across resistor 39 which decreases the threshold voltage across rectifier 31 from 0.6 volts to 0.3 volts. The resultant sensitivity level of the tag is governed by the ratio of the resistances of resistor 39 to resistor 33, along with the voltage of the sensitivity control signal on line 38.

Once the sensitivity of the tag is thus increased and the readback message signal (with the two reversed bits) is backscatter-modulated and returned to the interrogator, the interrogator may, if it desires to write information into that particular tag, then send an RF WRITE signal. The WRITE signal appears on antenna 30, passes through rectifier 31, resistor 40, from the base to the collector of bipolar transistor 41 and on through level detector 35 to the WRITE signal decoder 36. WRITE signal decoder 36 separates the signal voltage-time pattern into the codes for a COMMAND 1, a binary 1 or a binary 0. These are the three possible signals shown in FIG. 2.

If the RF signal is a WRITE signal, the WRITE signal decoder 36 recognizes the WRITE signal by the presence of a COMMAND 1 signal. Once recognized as a WRITE signal, the WRITE signal is allowed to pass through control logic 34 to the tag message memory 42 where the frames of data to be written into the tag will be stored. This message memory may be any non-volatile memory, such as EEPROM, EAROM or battery-backed RAM. During an actual WRITE operation, level detector 35 makes sure the signal remains of sufficient RF strength and the WRITE signal decoder 36 recognizes the signal as a WRITE signal and the control logic 34 allows the tag memory 42 to store the data. Then the control logic 34 pulls the newly written data from the tag memory 42 and puts it out onto readback message line 37 for transmission to and verification by the interrogator.

Resistors 33 and 40 and capacitor 43 adjust the threshold level of the tag for detecting received RF pulses. This level is preferably maintained at about the mid-point of the normal received pulse height. Resistors 33 and 40 set this level, and capacitor 43 holds it in place during the intervals between pulses. Resistor 39, together with the output voltage on line 38 from control logic 34, determine how much the tag sensitivity will be increased after the tag has received an RF signal from the interrogator of sufficient strength for the interrogator to write information into it. Resistor 44 is a normal load resistor. In a preferred embodiment of the invention, resistor 40 is 10 Kohms, resistor 33 is 30 Kohms, resistor 39 is 270 Kohms, resistor 44 is also 270 Kohms and capacitor 43 is 0.022 microfarads.

Figure 4:
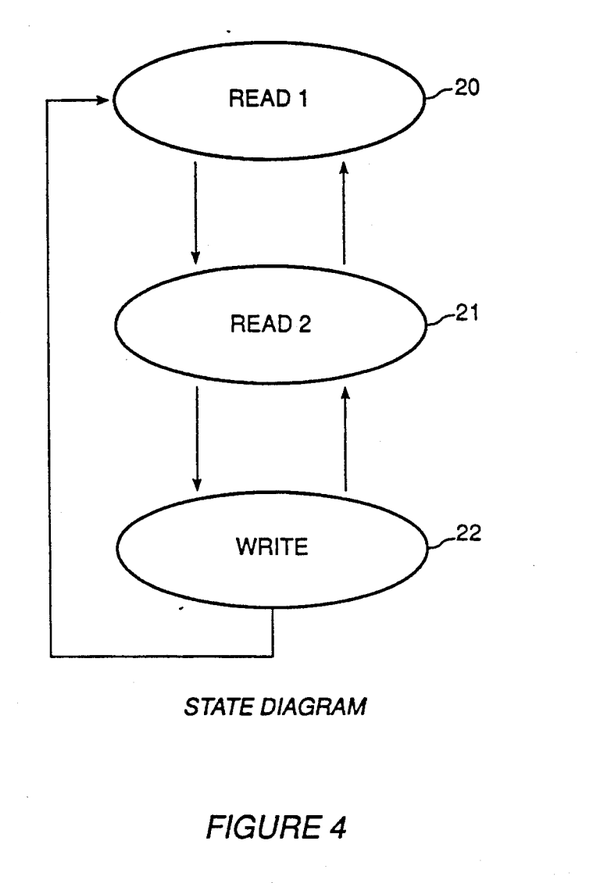
FIG. 4 is a state diagram of a tag of the invention.

The tag state diagram of FIG. 4 illustrates the signalling sequence used for reading information from the tag and writing information to the tag. When the tag is not in the RF range of the interrogator, it remains in the READ 1 mode 20. While in this mode, the tag is continually scrolling so that it is always ready to backscatter-modulate any received RF signal with the data in its message memory. As soon as the tag enters into an RF field from an interrogator, when the field is above a predetermined strength, the tag senses that strength and switches into the READ 2 mode 21 in FIG. 4. This is done as described above. In the READ 2 mode, the tag has increased sensitivity and the tag still backscatter-modulates the received RF signal with the data in its tag memory. Assuming the tag is a read/write tag, it will reverse the two bits to indicate its readiness to be written to.

The interrogator, receiving all this identity information as well as the two reversed bits, knows the ID of the tag, that it is a read/write tag and that it is in range and ready to be written into. Where the interrogator has data to be written into that tag, the interrogator will then send the data frame to be written. The interrogator first sends a COMMAND 1 pulse which tells the tag it intends to write data. The tag then, recognizing the COMMAND 1 pulse, causes the scrolling to stop. This is accomplished by the write signal decoder 36 sending a signal to the control logic 34 (shown in FIG. 3), which in turn disconnects its output line 37. The tag is now in the WRITE mode 22 shown in FIG. 4. Next the interrogator sends the first 120 bits of fixed data to the tag. The control logic 34 compares this fixed data, bit by bit, with the data in the tag memory 42. If they agree, the tag memory 42 is unlocked by control logic 34 so it may be written into through line 46. This verification procedure prevents a tag being overwritten with the wrong data.

After the tag has received and compared the 120-bit identification message, the interrogator sends an additional eight bit command word to the tag. COMMAND words are sent to the tag by the interrogator while the tag is in the WRITE mode 22. These frames set up the tag in the mode to do various operations, including scrolling through the contents of its memory, or receiving a WRITE command from the interrogator.

In operation, a command word tells the tag what to do with the next 128 bits it will receive. In the present embodiment, there are four possibilities: (1) to write the data into a volatile data field; (2) to write the data into a fixed data field; (3) to unlock a fixed data field to allow data to be written into it; or (4) to lock a fixed data field so that no data may be written into it. When the tag then receives the next one hundred twenty-eight bits of data, it will act in accordance with the command word. The tag recognizes the code which indicates the end of data to be written and switches itself back to the READ 2 mode shown in FIG. 4. This completes the WRITE operation. The described embodiment is limited to 256 bits of data, and a limited command set. The invention, however, permits the use of additional data frames and control of the reading and writing of specific frames, limited only by memory capacity and the time the tag is within the RF field of the reader.

After returning to the READ 1 mode, line 37 will be reconnected and the tag will continue scrolling, sending back all its fixed and its newly written data to the interrogator. This, of course, can occur either before or after the tag has left the increased sensitivity WRITE range. As was discussed earlier, tags may still be read even after they no longer can be written into. Accordingly, by reading the newly scrolling data, the interrogator can verify that its WRITE message was properly received, decoded and stored in the tag's memory. Furthermore, if the tag has not yet left the WRITE range, and the interrogator happens to detect an error in the new message, the interrogator can retransmit the same message and re-attempt to place the correct data into the tag's memory.

Where the tag is in the WRITE mode 22, and the RF field stops for some reason so that the tag is no longer receiving an RF signal from the interrogator, level detector 35 (FIG. 3) sends a signal to control logic 34 to cause the tag to revert to the READ 1 mode 20 shown in FIG. 4.

The advantage of the variable threshold sensitivity feature provided by the circuit of the preferred embodiment shown in FIG. 3 is that in the READ 1 mode, where there is no transmitted RF signal, the circuit draws almost no background current. During those periods, the detection level sensitivity is about 0.6 volts, which is the normal emitter-base threshold voltage of silicon bipolar transistor 41. Accordingly, during these quiescent periods, that transistor 41 is OFF and draws almost no current. However, in the presence of an RF signal which exceeds the predetermined threshold level, as discussed above, the tag is switched into its more sensitive, active mode, the voltage across resistor 33 goes up from 0 volts to 0.3 volts and the signal threshold voltage drops by the same amount to 0.3 volts. In this active "WRITE" mode, operating current is drawn, but only during the period when a WRITE signal is being transmitted from the interrogator. As soon as the WRITE procedure has been completed and the new data stored, the tag automatically reverts to the lower sensitivity READ 1 mode because level detector 35 will detect the reduced RF signal for a period of time longer than is normal for any transmitted pulse chain. Since the increased operating current is on only for short periods of time during a WRITE operation, there is very little penalty in tag battery life.

This increase in tag sensitivity during a WRITE operation is important because it ensures, as a tag approaches the interrogator, that the signals will be properly received. RF levels do not always increase smoothly as a vehicle or train bearing a tag approaches an interrogator. There are often local dips in RF signal levels due to standing waves, shadowing or other reasons. By increasing tag sensitivity during the WRITE cycle, the probability of continuing to have sufficient RF to provide a secure, uninterrupted write operation is increased.

The system of the invention preferably uses a single common RF carrier and RF signal polarization for both the READ and the WRITE signals. The system uses a common antenna 30, shown in FIG. 4, as well as a common rectifier circuit 31 for both the reception of WRITE data from the interrogator and for modulating a load onto the same rectifier circuit 31 for sending backscatter-modulated signals back to the interrogator during the READ operation. It would be possible, if desired, and may in some cases be preferable to use two antennas on the tag, one for receiving data and one for sending. However, a single antenna allows for a smaller tag.

Time division multiplexing is used to separate the reader-to-tag communications from the tag-to-interrogator communications. Often, several or many interrogators must operate simultaneously in close proximity with one another. An example of such an installation is at a toll plaza on a toll road, tunnel, or bridge, where every lane may have an interrogator. In such installations, interrogators are synchronized so that the modulated signals produced by interrogators do not interfere with other interrogators reading data from other tags. Interference between interrogators while tags are being read is eliminated by using different frequencies so that each interrogator operates on a unique frequency. Data received by the tag is determined to be valid in accordance with a threshold voltage value, which may be adjusted using resistors 33 and 40 and capacitor 43, together with sensitivity control signal 38. This threshold is preferably maintained at about the mid-point of the normal received pulse height. This self-compensation feature reduces corruption of data due to other extraneous sources of RF energy, such as unrelated sources at frequencies close to the interrogatory frequency, such as cellular phones, and signals produced by other nearby interrogators.

Reader synchronization may be done by wire or preferably using a self-synchronizing feature of the invention. If one interrogator is attempting to write to a tag, the modulation of the signal sent by that interrogator may cause interference with an adjacent interrogator. An integral part of the write cycle is to first read all data from the tag. During this reading time period, an adjacent interrogator can also read a tag if one is present, and consequently becomes synchronized automatically to the first interrogator. After both interrogators have acquired two frames of data from their respective tags, then both are ready to write and thus are in synchronization with each other.

As will be apparent to those skilled in the art, many modifications can be made to the preferred embodiment of the invention shown in FIGS. 1-4 and described above. Accordingly, the invention is only limited as set forth in the claims which follow.

We claim:

1. A system for identifying, for writing data into, and reading data out of remote objects which may be in motion relative to the interrogator, comprising:
    an interrogator for sending an RF signal to said remote object, said signal including data intended to be received and stored by said remote object;
    at least one remote object capable, upon receipt of said RF signal, of backscatter-modulating said RF signal and returning a backscatter-modulated signal to said interrogator, said backscatter-modulated signal being modulated with data indicating the identity and other data stored in said remote object;
    said interrogator having the capability (1) to recognize the said identity and other data stored in said remote object from said returned backscatter-modulated signal and (2) to transmit data to said remote object only if said interrogator has data to be transmitted to that identified remote object, whereby data may be selectively transmitted to and received and stored by a remote object only after such remote object has been identified as the correct remote object to receive such data.

2. The system for identifying, for writing data into, and reading data out of remote objects of claim 1 further characterized by said remote object being continuously capable of backscatter-modulating received RF signals with its stored data even when no RF signal is being received from said interrogator.

3. The system for identifying, for writing data into and reading data out of remote objects of claim 1 further characterized by said remote object having the further capability of increasing its sensitivity to received RF signals containing data to be written into said remote object after receipt and recognition of an RF signal of adequate strength for data to accurately be written into said remote object.

4. A system for identifying, for writing data into and for reading data out of remote objects which may be in motion relative to the interrogator, comprising:
    an interrogator for sending an RF signal to said remote object, said signal including data intended to be received and stored by said remote object;
    at least one remote object capable, upon receipt of said RF signal, of backscatter-modulating said RF signal and returning a backscatter-modulated signal to said interrogator, said backscatter-modulated signal being modulated with data indicating (1) the identity and other data stored in said remote object and (2) its ability or inability to receive and store transmitted data from said interrogator; and
    said interrogator having the capability (1) to recognize the said identity and other data stored in said remote object from said returned backscatter-modulated signal and (2) to transmit data to said remote object only if (i) said interrogator has data to be transmitted to that identified remote object, and (ii) said backscatter-modulated returned signal indicates the ability of said remote object to receive and store transmitted data, whereby data may be selectively transmitted to and received and stored by a remote object having data storage capability only after such remote object has been identified as the correct remote object to receive such data.

5. The system for identifying, for writing data into and reading data out of remote objects of claim 4 further characterized by said remote object indicating to said interrogator its ability to receive and store transmitted data by the existence of writable semiconductor memory within said object.

6. The system for identifying, for writing data into and reading data out remote objects of claim 4 further characterized by said remote object determining its ability to receive and store transmitted data by sensing the strength of the received RF signal and determining whether or not it is adequate for data accurately to be written into said remote object, and indicating this ability to said interrogator.

7. A tag adapted to be attached to a remote object, said tag containing data identifying said remote object and other stored data and being capable of having at least a portion of its data contents varied by the receipt of an RF signal from a transmitter which may be in motion relative to said tag, comprising:
    a writable memory;
    a backscatter-modulating means which, upon receipt of said RF signal, backscatter-modulates said RF signal and returns a backscatter-modulated signal to said transmitter, said backscatter-modulated returned signal being modulated with data including the identity of said remote object, said remote object being continuously capable of backscatter-modulating received RF signals even when no RF signal is being received.

8. The tag of claim 7 further characterized by being capable of indicating to said interrogator its ability to receive and store data by the existence in said tag of writable semiconductor memory.

9. The tag of claim 7 further characterized by being capable of determining its ability to receive and store transmitted data by sensing the strength of the received RF signal and determining whether or not it is adequate for data accurately to be written into said tag.

10. The tag of claim 9 further characterized by having the capability, upon receipt of said RF signal, of backscatter-modulating said RF signal and returning a signal modulated with data indicating (1) the identity and other data stored in said remote object and (2) whether or not the received RF signal is of sufficient strength so that the tag is able to receive and store transmitted data from said interrogator.

11. The tag of claim 7 further characterized by having the capability of increasing its sensitivity to received RF signals containing data to be written into said tag after receipt and recognition of an RF signal of adequate strength for data accurately to be written into said tag.

* * * * *

(12) EX PARTE REEXAMINATION CERTIFICATE (7475th)
United States Patent
Landt et al.

(10) Number: US 5,030,807 C1
(45) Certificate Issued: May 4, 2010

(54) SYSTEM FOR READING AND WRITING DATA FROM AND INTO REMOTE TAGS (75) Inventors: Jeremy A. Landt, Los Alamos, NM (US); Alfred R. Koelle, Santa Fe, NM (US)

(73) Assignee: Intermec IP Corp., Woodland Hills, CA (US)

Reexamination Request:
No. 90/008,613, Jun. 27, 2007

Reexamination Certificate for:
Patent No.: 5,030,807
Issued: Jul. 9, 1991
Appl. No.: 07/465,428
Filed: Jan. 16, 1990

(51) Int. Cl.
*G08G 1/017* (2006.01)
*G07B 15/00* (2006.01)
*B61L 25/00* (2006.01)
*B61L 25/04* (2006.01)
*G06K 7/00* (2006.01)

(52) U.S. Cl. ............... 235/375; 235/380; 342/44; 342/50

(58) Field of Classification Search ............ None
See application file for complete search history.

(56) References Cited

U.S. PATENT DOCUMENTS

| | | | |
|---|---|---|---|
| 4,001,822 A | 1/1977 | Sterzer | |
| 4,075,632 A | 2/1978 | Baldwin et al. | 343/6.8 R |
| 4,107,046 A | 8/1978 | Corder | 210/282 |
| 4,114,151 A | 9/1978 | Denne et al. | 343/6.8 LC |
| 4,303,904 A | 12/1981 | Chasek | |
| 4,360,810 A | 11/1982 | Landt | 343/6.5 R |
| 4,390,880 A | 6/1983 | Henoch | |
| 4,674,618 A | 6/1987 | Eglise et al. | 194/210 |
| 4,691,202 A | 9/1987 | Denne | |
| 4,739,328 A | 4/1988 | Koelle et al. | 342/44 |
| 4,782,345 A | 11/1988 | Landt | 343/727 |
| 4,786,907 A | 11/1988 | Koelle | 342/51 |
| 4,816,839 A | 3/1989 | Landt | 343/795 |
| 4,835,377 A | 5/1989 | Brown | 235/492 |
| 4,853,705 A | 8/1989 | Landt | 343/803 |
| 4,912,471 A | 3/1990 | Tyburski | |
| 4,983,976 A | 1/1991 | Ogata | |
| 5,103,222 A | 4/1992 | Hogen Esch et al. | 340/825.54 |
| 5,216,419 A | 6/1993 | Fujisaka et al. | 340/825.54 |
| 5,528,222 A | 6/1996 | Moskowitz et al. | 340/572 |
| 5,828,318 A | 10/1998 | Cesar | 340/825.69 |
| 5,850,181 A | 12/1998 | Heinrich et al. | 340/572 |
| 6,121,880 A | 9/2000 | Scott et al. | 340/572.5 |
| 6,400,274 B1 | 6/2002 | Duan et al. | 340/572.7 |
| 6,812,841 B2 | 11/2004 | Heinrich et al. | 340/572.1 |
| 6,812,852 B1 | 11/2004 | Cesar | 340/825.69 |

FOREIGN PATENT DOCUMENTS

EP 0324564 7/1989

OTHER PUBLICATIONS

Landt, J., "Shrouds of Time—The History of RFID," The Association for Automatic Identification and Data Capture Technologies, pp. 1–11, Oct. 1, 2001.

(Continued)

*Primary Examiner*—Zoila E Cabrera (57) ABSTRACT

The subject invention relates to a system for identifying, for writing data into and reading data out of electronic tags which may be attached to moving and moveable objects. An interrogator sends an RF signal to a remote tag, the signal including data intended to be received and stored in the tag. The tag backscatter-modulates the received signal with data temporarily and permanently stored in the tag, including data indicating the identity of the object to which the tag is attached. The interrogator has the capability of (1) recognizing the identity of the tagged object from the returned backscatter-modulated signal and (2) transmitting data to the tag only if it has data to be transmitted to that particular tagged object. This permits data to be selectively transmitted to a tag and received and stored by that tag only after the tag has been identified as a correct one to receive that data. The tag, in addition, may have the capability of increasing its sensitivity to the receipt of transmitted data after receiving a signal from the interrogator of sufficient strength to be capable of transmitting data to that tag.

OTHER PUBLICATIONS

Ingels, Franklin, *Information and Coding Theory*, Intext Educational Publishers, 1971, pp. 110–111.

Koelle et al., "Short–Range Radio–Telemetry for Electronic Identification, Using Modulated RF Backscatter," *Proceedings of the IEEE 63*(8): 1260–1261, 1975.

Denning, Dorothy, *Cryptography and Data Security*, Addison–Wesley, 1982, pp. 1, and 7–8.

Goos et al., "Cryptography: Proceedings of the Workshop on Cryptography," Burg Feuerstein, Germany, Mar. 29–Apr. 2, 1982.

Rinaldo, "Introducing the Packet Adapative Modem," 1983, p. 72.

Henoch, Bengt T. "Electronic Programmable Labels Put the Database on the Product," *Numerical Engineering Society Annual Conference on Advances in Manufacturing Technology*, 1984, pp. 4–6.

Koelle, "Advances in Practical Implementation of AVI Systems," *Vehicle Navigation and Information Systems Conference 2*:969–975, 1991.

Sterzer, F., "An electronic license plate for motor vehicles," RCA Review, vol. 35, Jun. 1974, pp. 167–175.

Henoch, B.T., "Programmable Remote Identification", Proceedings of the International Symposium on Automotive Technology and Automation with Particular Reference to Computer Aided Engineering and Manufacturing, 1982, pp. 481–496.

Koelle, A.R., "Short range UHF telemetry system using passive transponders for vehicle ID and status information", IEEE Workshop on Automotive Applications of Electronics, Oct. 19, 1988, pp. 34–38.

AX.25 Amateur Packet–Radio Link–Layer Protocol Version 2.0, Oct. 1984, downloaded from [http://www.radio-active.net/au/web/personal/vk2ffg/ax25.html,]Mar. 27, 2006.

Borden, D.W., "Data communications", QEX, Feb. 1982, pp. 8, 16, 17, Apr. 1982, pp. 18–19, Jun. 1982 pp. 9–10.

McLarnon, B.D., "HF Packet: Where do we go from here?", ARRL Amateur Radio 6th Computer Networking Conference, American Radio Relay League, Aug. 29, 1987, pp. 126–130.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 4–6 is confirmed.

Claim 1 is cancelled.

Claims 2–3 and 7–11 were not reexamined.

* * * * *